United States Patent [19]

Homma

[11] Patent Number: 5,029,160
[45] Date of Patent: Jul. 2, 1991

[54] LINE CONCENTRATION SYSTEM

[75] Inventor: Masahiro Homma, Kawasaki, Japan

[73] Assignee: Fujitsu Limited, Kawasaki, Japan

[21] Appl. No.: 470,794

[22] Filed: Jan. 26, 1990

[30] Foreign Application Priority Data

Jan. 27, 1989 [JP] Japan .................................. 1-019191

[51] Int. Cl.⁵ .............................................. H04Q 11/00
[52] U.S. Cl. ........................................ 370/56; 370/84; 370/112
[58] Field of Search ...................... 370/56, 112, 84, 66, 370/67, 53, 58.1, 58.2, 58.3, 85.1; 379/214, 333, 334

[56] References Cited

U.S. PATENT DOCUMENTS

| | | | |
|---|---|---|---|
| 3,303,475 | 11/1963 | Hellerman et al. | 370/112 |
| 4,385,379 | 5/1983 | Kelly et al. | 370/67 |
| 4,512,014 | 4/1985 | Binz et al. | 370/84 |
| 4,656,625 | 4/1987 | Nojiri et al. | 370/112 |
| 4,698,801 | 10/1987 | Hatano et al. | 370/84 |
| 4,805,165 | 2/1989 | Kawamura et al. | 370/112 |

FOREIGN PATENT DOCUMENTS 56-147593 11/1981 Japan .

Primary Examiner—Douglas W. Olms
Assistant Examiner—Alpus H. Hsu
Attorney, Agent, or Firm—Staas & Halsey

[57] ABSTRACT

A line concentration system containing: a plurality of data input/output circuits; a plurality of first-side transmission lines to each of which one of a plurality of data input/output circuits can be connected; a second-side transmission line, and a data input/output timing controller. The second-side transmission line is connected with the above plurality of first-side transmission lines, and is capable of transmitting a predetermined number of channels of data. Each of the above data input/output circuits inputs/outputs data at a controlled timing from/onto the first-side transmission line to which its own data input/output circuits is connected. The data input/output timing controller controls the timings of the above inputs/outputs by the above plurality of data input/output circuits so that data input/output operations in two of the data input/output circuits are not simultaneously carried out. In addition, the line concentration system further contains a connection switching circuits, which is provided for connecting a controlled number of corresponding first-side transmission lines with the second-side transmission line; and the controlled number can be selected among a plurality of predetermined numbers.

6 Claims, 11 Drawing Sheets

LINE CONCENTRATION SYSTEM

BACKGROUND OF THE INVENTION (1) Technical

The present invention relates to a line concentration system, which is in particularly useful in a small size exchange system, e.g., a private branch exchange system.

(2) Description of the Related Art

In a rather large size exchange system, e.g., in an exchange station in a public telephone network, line concentrators are provided between line circuits and speech path exchange circuits for handling a greater number of channels in a subscriber side in an exchange circuit side. Concentration rates for concentrators are respectively selected according to traffic intensities in the subscriber side capacities in the exchange circuit side. Generally, less traffic in the subscriber side requires a greater concentration rate in a concentrator to effectively utilize the total capacity of the exchange system.

However, in conventional concentrators, a concentration rate in a concentrator cannot be easily changed, i.e., the concentration rate is fixed. Further, in a rather small size exchange system, e.g., a private branch exchange system, no concentrator is provided, i.e., the concentration rate is one.

Namely, in the conventional exchange system, to change a concentration rate, a plurality of concentrators for respective concentration rates must be provided. Therefore, ineffective spaces for installing a plurality of concentrators are necessary in the conventional exchange system, and a troublesome operation is necessary to disconnect a group of subscriber channels from one concentrator and connect the group to another concentrator to change the concentration rate.

SUMMARY OF THE INVENTION

An object of the present invention is to provide a line concentration system, wherein a concentration rate is easily changed, and ineffective spaces for installing a plurality of concentrators for a group of subscriber channels are unnecessary.

According to the first aspect of the present invention, there is provided a line concentration system comprising: a plurality of data input means; a plurality of first-side transmission lines to each of which one or more data input means can be connected; a second-side transmission line connected with the above plurality of first-side transmission lines, and being capable of transmitting a predetermined number of channels of data; and a data input timing control means. Each of the above data input means inputs data at a controlled timing from the first-side transmission line to which its own data input means is connected. The above data input timing control means controls the timings of the above inputs by the above plurality of data input means so that data input operations in two of the data input means are not simultaneously carried out.

According to the second aspect of the present invention, there is provided a line concentration system comprising: a plurality of data output means; a plurality of first-side transmission lines to each of which one or more data output means can be connected; a second-side transmission line connected with the above plurality of first-side transmission lines, and being capable of transmitting a predetermined number of channels of data; and a data output timing control means. Each of the above data output means outputs data at a controlled timing onto the first-side transmission line to which its own data output means is connected. The data output timing control means controls the timings of the above outputs by the above plurality of data output means so that data output operations in two of the data output means are not simultaneously carried out.

According to the third aspect of the present invention, there is provided a line concentration system comprising: a plurality of data input means; a plurality of first-side transmission lines to each of which one of the above plurality of data input means can be connected; a plurality of second-side transmission lines; a connection switching means, provided between the above plurality of first-side transmission lines and the above plurality of second-side transmission lines, for connecting a controlled number of corresponding first-side transmission lines with a corresponding one of the plurality of second-side transmission lines; and a data input timing control means. Each of the above plurality of second-side transmission lines being capable of transmitting a predetermined number of channels of data. Each of the above data input means inputs data at a controlled timing from the first-side transmission line to which its own data input means is connected. The above data input timing control means controls the timings of the above inputs by the above plurality of data input means so that data input operations in two of the data input means from the corresponding first-side transmission lines which are connected to one of the second-side transmission lines, are not simultaneously carried out. In the above connection switching means, the above controlled number can be selected from among a plurality of predetermined numbers.

According to the fourth aspect of the present invention, there is provided a line concentration system comprising: a plurality of data output means; a plurality of first-side transmission lines to each of which one of the above plurality of data output means can be connected; a plurality of second-side transmission lines; a connection switching means, provided between the above plurality of first-side transmission lines and the plurality of second-side transmission lines, for connecting a controlled number of first-side transmission lines with a corresponding one of the plurality of second-side transmission lines; and a data output timing control means. Each of the above plurality of second-side transmission lines being capable of transmitting a predetermined number of channels of data. Each of the above data output means outputs data at a controlled timing onto the first-side transmission line to which its own data output means is connected. The above data output timing control means controls the timings of the above outputs by the above plurality of data output means so that data output operations from two of the above data output means onto the corresponding first-side transmission lines which are connected to one of the second-side transmission lines, are not simultaneously carried out. In the above connection switching means, the above controlled number can be selected from among a plurality of predetermined numbers.

DESCRIPTION OF THE PREFERRED EMBODIMENTS

Before describing the preferred embodiment of the present invention, first, a basic construction which is used in the present invention is explained below.

Figure 1:
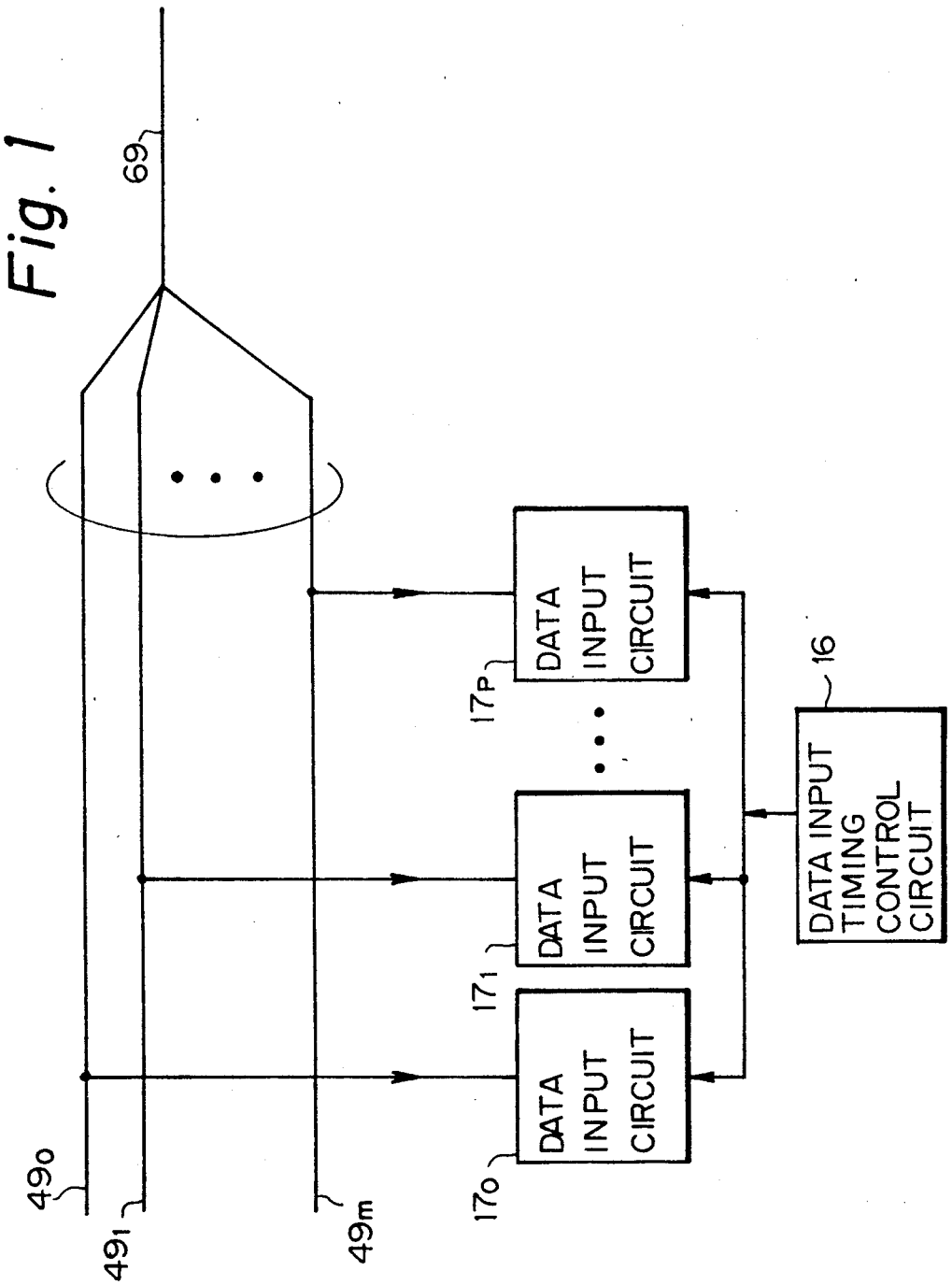
FIGS. 1 and 2 each show a basic principle of the present invention.
Figure 2:
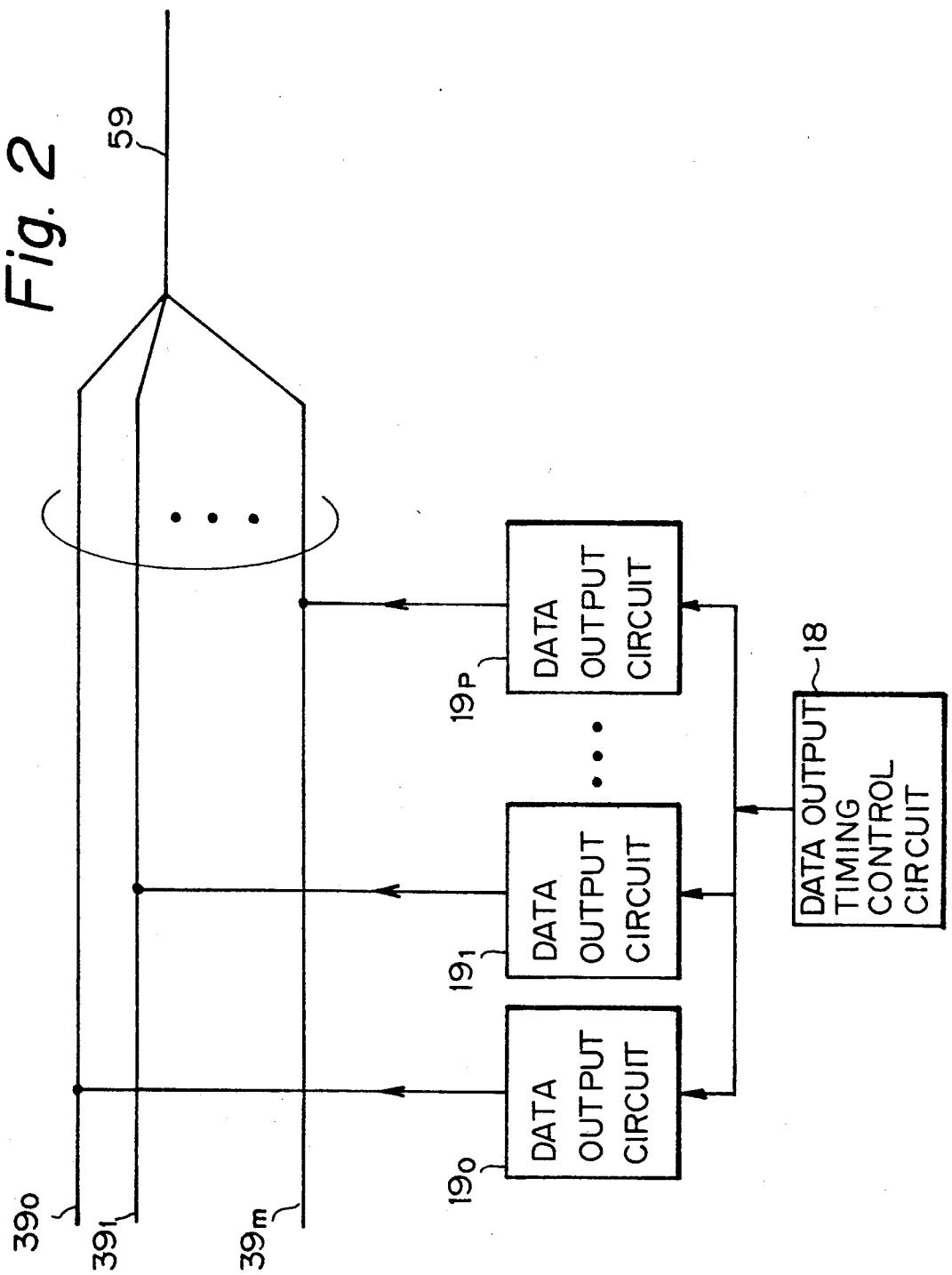

FIGS. 1 and 2 each show a basic construction which is used the present invention. FIG. 1 corresponds to the aforementioned first aspect of the present invention, and FIG. 2 corresponds to the aforementioned second aspect of the present invention.

In FIG. 1, reference numeral $49_0, 49_1, 49_2, \ldots 49_m$ denotes a plurality of first-side transmission lines, 69 denotes a second-side transmission line, $17_0, 17_1, 17_2, \ldots 17_p$ denotes a plurality of data input circuits, and 16 denotes a data input timing control circuit.

One (or more) of data input circuits $17_0, 17_1, 17_2, \ldots 17_p$ is connected to each of the plurality of first-side transmission lines $49_0, 49_1, 49_2, \ldots 49_m$.

The plurality of first-side transmission lines $49_0, 49_1, 49_2, \ldots 49_m$ are connected with the second-side transmission line 69, and the second-side transmission line 69 can transmit a predetermined number of channels of data.

Each of the data input circuits $17_0, 17_1, 17_2, \ldots 17_p$ inputs data at a controlled timing from the first-side transmission line to which its own data input circuit is connected.

The data input timing control circuit 16 controls the timings of the inputs by the plurality of data input circuits $17_0, 17_1, 17_2, \ldots 17_p$ so that data input operations in two of the data input circuit are not simultaneously carried out.

In the construction of FIG. 1, multiplexed data (including a plurality of channels of data), which is transmitted on the second-side transmission line 69, is then transmitted on each of the first-side transmission lines $49_0, 49_1, 49_2, \ldots 49_m$ in parallel. Under the control of the data input timing control circuit 16, each of the data input circuits $17_0, 17_1, 17_2, \ldots 17_p$ can input data on one or more channels which are determined by the control of the data input timing control circuit 16, from the multiplexed data on a first-side transmission line to which the data input circuit is connected, where data on each channel is not doubly input into two or more data input circuits, although the plurality of data input circuits $17_0, 17_1, 17_2, \ldots 17_p$ are respectively connected to different transmission lines $49_0, 49_1, 49_2, \ldots 49_m$ in the first side.

Namely, data in the plurality of channels of a multiplexed data on the second-side transmission line 69 can be respectively delivered to a plurality of data input circuits $17_0, 17_1, 17_2, \ldots 17_p$ through a plurality of first-side transmission lines $49_0, 49_1, 49_2, \ldots 49_m$, under the control of the data input timing control circuit 18.

In FIG. 2, reference numerals $39_0, 39_1, 39_2, \ldots 39_m$ denote a plurality of first-side transmission lines, 59 denote a second-side transmission line, $19_0, 19_1, 19_2, \ldots 19_p$ denotes a plurality of data output circuits, and 18 denotes a data output timing control circuit.

One (or more) of data output circuits $19_0, 19_1, 19_2, \ldots 19_p$ is connected to each of the plurality of first-side transmission lines $39_0, 39_1, 39_2, \ldots 39_m$.

The plurality of first-side transmission lines $39_0, 39_1, 39_2, \ldots 39_m$ are connected with the second-side transmission line 59, and the second-side transmission line 59 can transmit a predetermined number of channels of data.

Each of the data output circuits $19_0, 19_1, 19_2, \ldots 19_p$ outputs data at a controlled timing onto the first-side transmission line to which its own data output circuit is connected.

The data output timing control circuit 18 controls the timings of the outputs by the plurality of data output circuits $19_0, 19_1, 19_2, \ldots 19_p$ so that data output operations in two of the data output circuit are not simultaneously carried out.

In the construction of FIG. 2, data which is transmitted on the plurality of first-side transmission lines $39_0, 39_1, 39_2, \ldots 39_m$, are logically summed, and the logically summed data is then transmitted on the second-side transmission line 59. Here, under the above control of the data output timing control circuit 18, the data output circuits $19_0, 19_1, 19_2, \ldots 19_p$ which are connected to respective first-side transmission lines $39_0, 39_1, 39_2, \ldots 39_m$, each output their output data at a different timing from each other onto the first-side transmission line to which its own data output circuit is connected. Therefore, no data superposes on the second-side transmission line 59. Namely, data which are output from a plurality of data output circuits $19_0, 19_1, 19_2, \ldots 19_p$ which are connected to respective first-side transmission lines $39_0, 39_1, 39_2, \ldots 39_m$, can be concentrated to a multiplexed data on the second-side transmission line 59 under the control of the output timing control circuit 18.

The above constructions of FIGS. 1 and 2, are applicable to a construction of a line concentrator, i.e., a line concentrator which can receive data from a plurality of data output circuits $19_0, 19_1, 19_2, \ldots 19_p$, respectively through different first-side transmission lines $39_0, 39_1, 39_2, \ldots 39_m$, and which can supply data to a plurality of data input circuits $17_0, 17_1, 17_2, \ldots 17_p$, respectively through different first-side transmission lines $49_0, 49_1, 49_2, \ldots 49_m$, where the number of the first-side transmission lines $39_0, 39_1, 39_2, \ldots 39_m$, or $49_0, 49_1, 49_2, \ldots 49_m$ which are connected to one second-side transmission line 59 or 69, correspond to a concentration rate. e.g., the number of the first-side transmission lines $39_0, 39_1, 39_2, \ldots 39_m$, or $49_0, 49_1, 49_2, \ldots 49_m$ which are connected to one second-side transmission line 59 or 69, is equal to a concentration rate when data transmission rates in both the first and second sides are equal.

The above basic constructions of FIGS. 1 and 2 are utilized to construct a line concentrator wherein a concentration rate is easily changed, and ineffective use of space for installing a plurality of concentrators for a group of subscriber channels is unnecessary, as explained below in the embodiment of the present invention.

Figure 3:
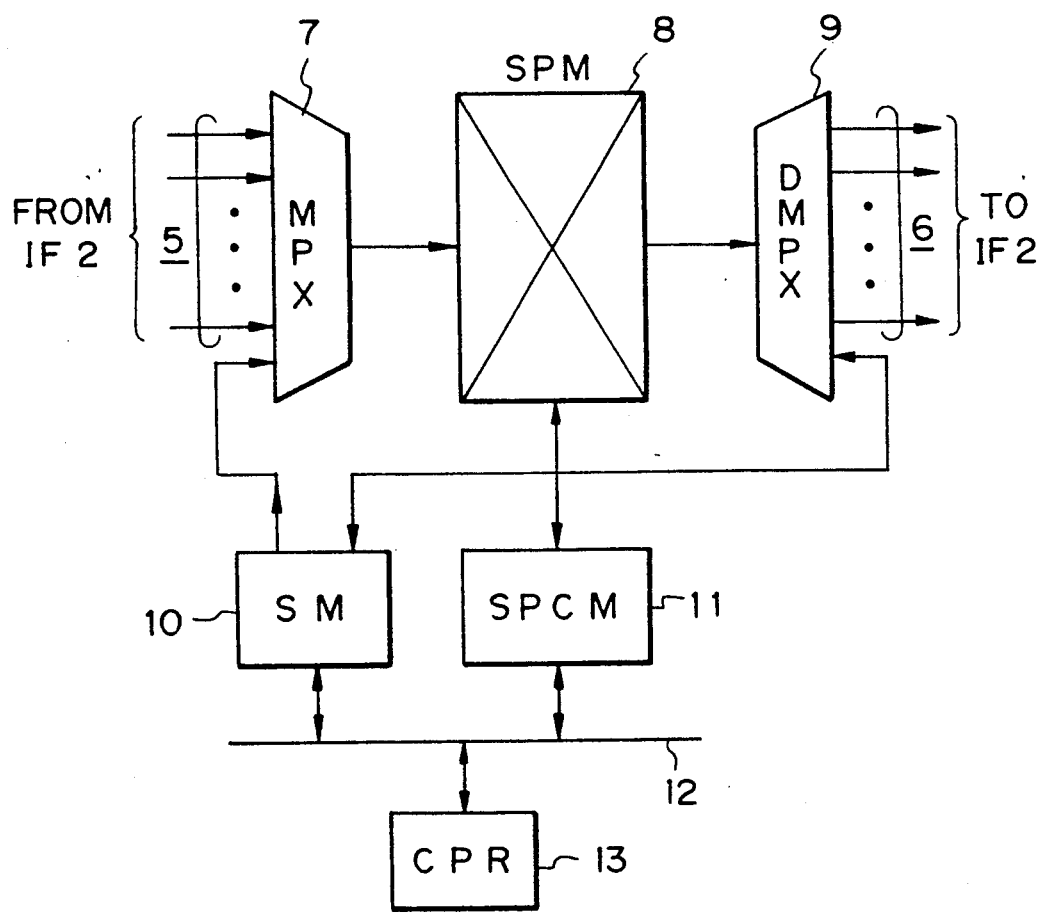
FIGS. 3 and 4 show an outline of the construction of a small size exchange system, such as a private branch exchange system.
Figure 4:
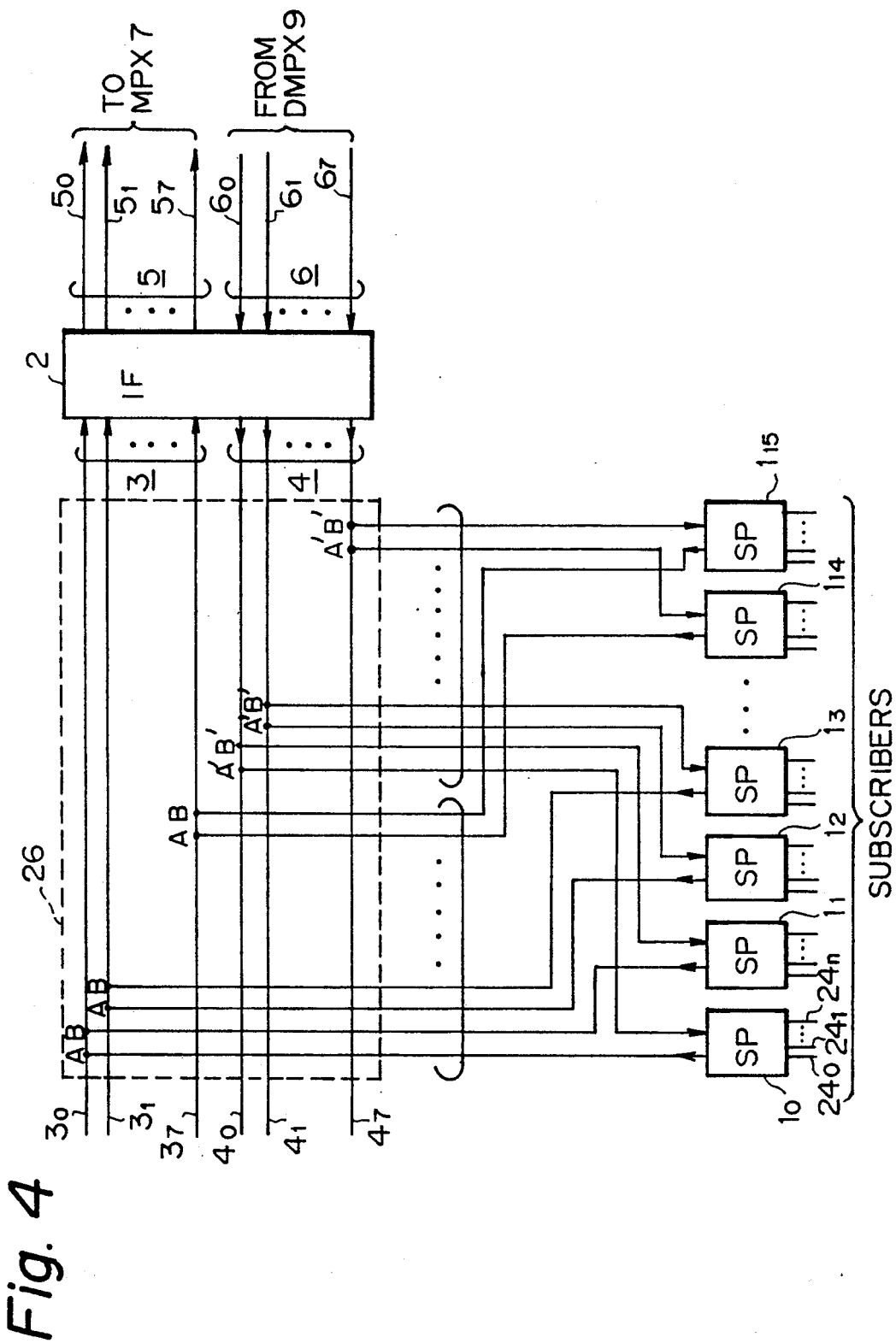

FIGS. 3 and 4 show an outline of the construction of a small size exchange system, such as a private branch exchange system.

In FIG. 3, reference numeral 7 denotes a multiplexer, 8 denotes a speech path memory, 9 denotes a demultiplexer, 10 denotes a supervisory memory, 11 denotes a speech path control memory, 12 denotes a bus, and 13 denotes a call processor.

In FIG. 4, reference numerals $3_0, 3_1, 3_2, \ldots 3_7, 4_0, 4_1, 4_2, \ldots 4_7$, each denote a data highway in the subscriber side, $5_0, 5_1, 5_2, \ldots 5_7, 6_0, 6_1, 6_2, \ldots 6_7$, each denote a data highway in the subscriber side, $1_0, 1_1, 1_2, \ldots 1_{15}$ each denote a subscribers package, 2 denotes an interface circuit and 26 denotes a connection unit.

Figure 5:
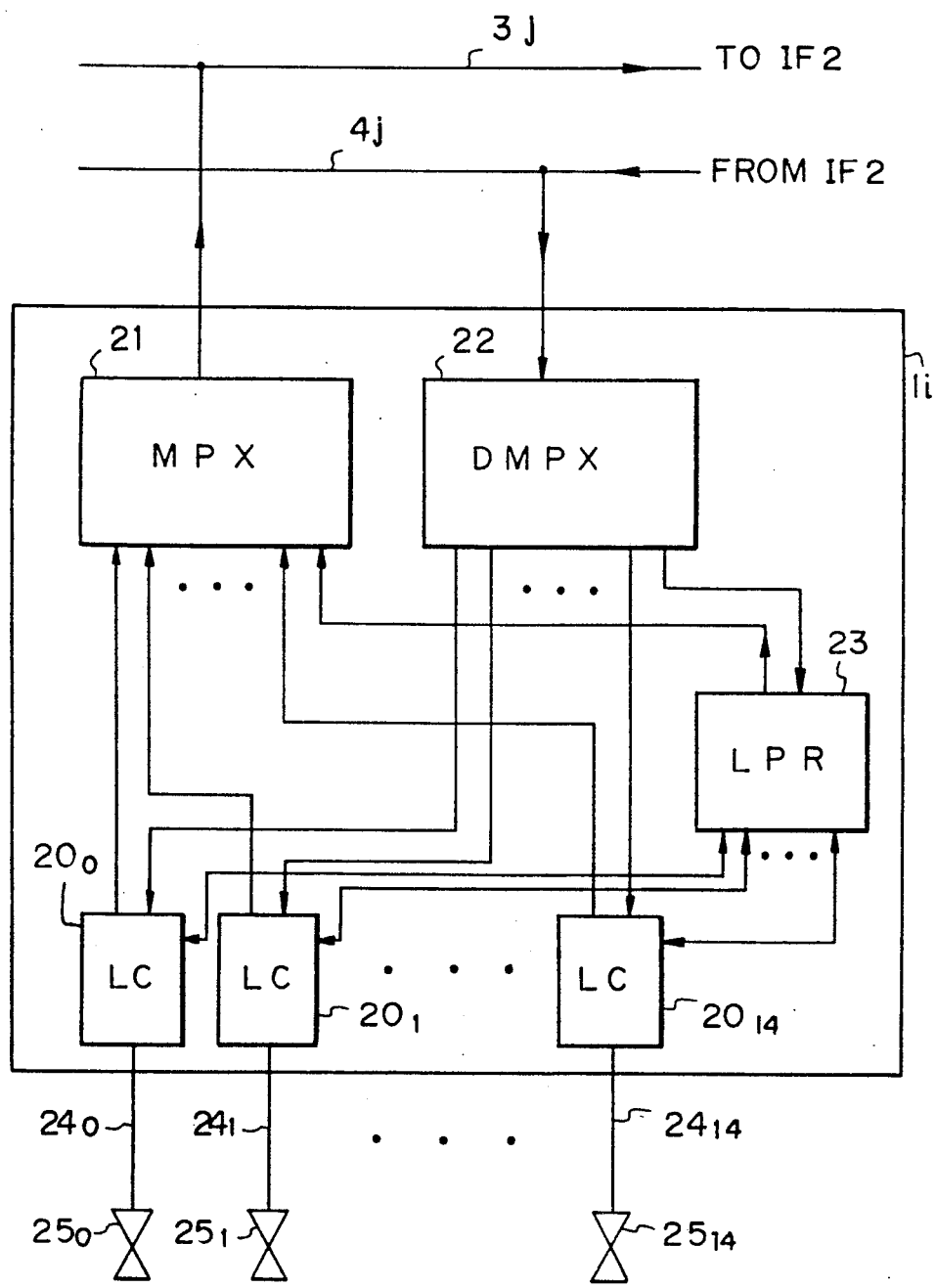
FIG. 5 shows, the construction of the subscribers package in FIG. 4.

FIG. 5 shows the construction of each subscribers package in FIG. 4.

In FIG. 5, reference numeral 21 denotes a multiplexer, 22 denotes a demultiplexer, 23 denotes a line processor, $20_0, 20_1, 20_2, \ldots 20_{14}$ each denote a line circuit, $24_0, 24_1, 24_2, \ldots 24_{14}$ each denotes a subscriber line, and $25_0, 25_1, 25_2, \ldots 25_{14}$ each denote a subscriber's terminal (telephone).

Each of the line circuits $20_0, 20_1, 20_2, \ldots 20_{14}$ is connected with a corresponding one of the subscribers' terminals $25_0, 25_1, 25_2, \ldots 25_{14}$ through the corresponding subscriber lines $24_0, 24_1, 24_2, \ldots 24_{14}$, respectively. Each line circuit carries out operations of transformation between a two-line system (on the side of the subscribers, terminals) and a four-line system (on the side of the exchange system), analog/digital transformation, loop supervision, including detection of calling, receiving of a dialing pulse, a ringing, a battery feeding to the corresponding subscriber, and the like.

The data received from the subscribers in all the line circuits $20_0, 20_1, 20_2, \ldots 20_{14}$, and transformed as above are multiplexed with control data from the line processor 23, in the multiplexer 21 in each subscribers package. The output terminal of the multiplexer 21 is connected to one of the data highways $3_0, 3_1, 3_2, \ldots 3_7$ in the subscriber side, and the multiplexed data is output on the data highway $3_j$.

The data on the data highways $3_0, 3_1, 3_2, \ldots 3_7$ are transmitted through the interface circuit 2 and the data highways $5_0, 5_1, 5_2, \ldots 5_7$ to the multiplexer 7 (shown in FIG. 3).

The multiplexer 7 further multiplexes the data on the data highways $5_0, 5_1, 5_2, \ldots 5_7$ together with control data from the supervisory memory 10, and the time slots in the multiplexed data are exchanged through reading and writing operations in the speech path memory 8.

The reading address or writing address of data of each time slot in the speech path memory 8 is given from the speech path control memory 11, where the content of the speech path control memory 11 is written by the call processor 13.

The call processor 13 collects the information on requests and statuses regarding communication through the exchange system of all the subscribers, which is necessary to carry out exchange operations, from all the subscribers packages $1_0, 1_1, 1_2, \ldots 1_{15}$.

This information is collected by the line processor 23 from all the line circuits $20_0, 20_1, 20_2, \ldots 20_{14}$ in each subscribers package $1_0, 1_1, 1_2, \ldots 1_{15}$, and is then transferred from the line processor 23 in each subscribers package $1_0, 1_1, 1_2, \ldots 1_{15}$, to the supervisory memory 10, by using a channel provided between the supervisory memory 10 and the line processors for transferring control data therebetween. The call processor 13 reads the information transferred from all the line processors 23, in the supervisory memory 10. Thus, based on the dialing information obtained as above, the call processor 13 writes speech path control address for exchanging time slots of the input of the speech path memory 8, on the speech path control memory 11.

The output of the speech path memory 8 is demultiplexed in the demultiplexer 8. The demultiplexed data except the control data which is transferred from the line processors 23, are transmitted through the data highways $6_0, 6_1, 6_2, \ldots 6_7$, the interface circuit 2, and the data highways $4_0, 4_1, 4_2, \ldots 4_7$, to each subscribers package $1_0, 1_1, 1_2, \ldots 1_{15}$, while the control data which is transferred from the line processors 23 is written in the supervisory memory 10.

The demultiplexer 22 in each subscribers package $1_j$ receives the data transmitted on the data highways $4_0, 4_1, 4_2, \ldots 4_7$, and the demultiplexes it, and delivers the demultiplexed data except the control data from the supervisory memory 10, to each line circuit $20_0, 20_1, 20_2, \ldots 20_{14}$, while the control data transmitted from the supervisory memory 10 is delivered to the line processor 23.

The call processor 13 writes control data which should be transmitted to the line processors 23, in the supervisory memory 10. The control data written in the supervisory memory 10 are then output to the multiplexer 7 to be multiplexed with the data from the data highways $5_0, 5_1, 5_2, \ldots 5_7$, the time slots of the control data are respectively exchanged to the time slots which are to be received by the objective subscribers packages, in the speech path memory 8. The data wherein their time slots have been exchanged, are demultiplexed in the demultiplexer 9, and are then delivered to respective data highways $6_0, 6_1, 6_2, \ldots 6_7$ to which the respective objective subscribers packages $1_0, 1_1, 1_2, \ldots 1_{15}$ are connected through the interface circuit 2 and the data highways $4_0, 4_1, 4_2, \ldots 4_7$.

The demultiplexer 22 in each subscribers package $1_0, 1_1, 1_2, \ldots 1_{15}$ receives the time slots assigned to its own subscribers package from a corresponding data highways $4_j$, and thus, the control data transmitted from the supervisory memory 10 is delivered to the objective line processor 23 as mentioned above.

The line processor 23 controls all the line circuits $20_0, 20_1, 20_2, \ldots 20_{14}$, the multiplexer 21, and the demultiplexer 22, based on the control data received from the supervisory memory 10 as above.

Figure 6:
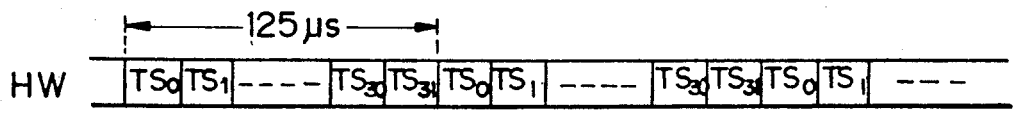
FIG. 6 shows the assignment of time slots on each data highway $3_0, 3_1, 3_2, \ldots 3_7, 4_0, 4_1, 4_2, \ldots 4_7$ in the construction of FIG. 4.

FIG. 6 shows the assignment of the time slots on each data highway $3_0, 3_1, 3_2, \ldots 3_7, 4_0, 4_1, 4_2, \ldots 4_7, 5_0, 5_1, 5_2, \ldots 5_7$, and $6_0, 6_1, 6_2, \ldots 6_7$ in the construction of FIG. 4 in the embodiment of the present invention.

As shown in FIG. 6, each data highway transmits 32 time slots $TS_0, TS_1, TS_2, \ldots TS_{31}$, with a period of 125 $\mu$s.

Figure 7:
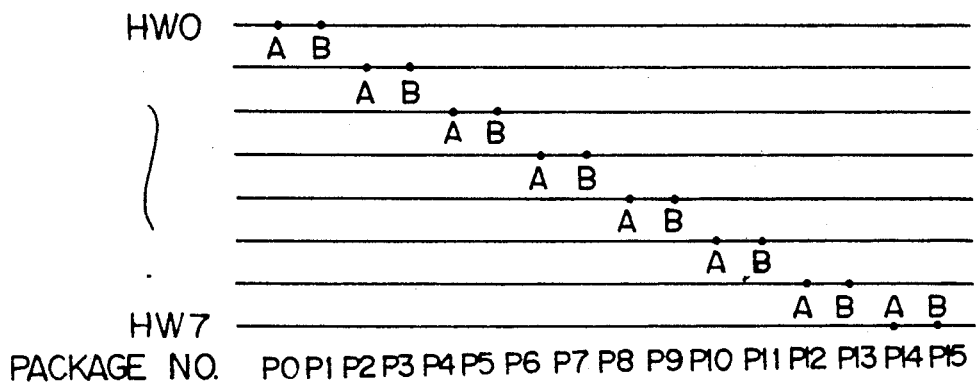
FIG. 7 shows the connections of the plurality of subscribers packages $1_0, 1_1, 1_2, \ldots 1_{15}$ with the data highways $3_0, 3_1, 3_2, \ldots 3_7$, or data highways $4_0, 4_1, 4_2, \ldots 4_7$ in the non-concentrated connection mode in the construction of FIG. 4.

FIG. 7 shows the connections of the plurality of subscribers packages $1_0, 1_1, 1_2, \ldots 1_{15}$ with the data highways $3_0, 3_1, 3_2, \ldots 3_7$, or data highways $4_0, 4_1, 4_2, \ldots 4_7$ in a non-concentrated connection mode in the embodiment of the present invention having the construction of FIG. 4, wherein "P0", "P1", ... "P15", each denote an identification number of the subscribers packages, and each corresponds to one of the subscribers packages $1_0$, $1_1$, $1_2$, ... $1_{15}$, and "A" and "B" each denote a connecting position of each data highway with a subscribers package.

Each of the data highways $3_0$, $3_1$, $3_2$, ... $3_7$ is connected with the output terminals of the multiplexers 21 in two of the subscribers packages $1_0$, $1_1$, $1_2$, ... $1_{15}$. As explained before with reference to FIG. 5, each subscribers package contains fifteen line circuits $20_0$, $20_1$, $20_2$, ... $20_{14}$, and one time slot is assigned for sending data from each line circuit $20_1$, $20_1$, $20_2$, ... $20_{14}$ toward the speech path memory 8, and one time slot is assigned for sending control data from the line processor 23 toward the speech path memory 8.

Similarly, each of the data highways $4_0$, $4_1$, $4_2$, ... $4_7$ is connected with the input terminals of the demultiplexers 22 in two of the subscribers packages $1_0$, $1_1$, $1_2$, ... $1_{15}$. One time slot is assigned for receiving data from the speech path memory 8 to each line circuit $20_0$, $20_1$, $20_2$, ... $20_{14}$, and one time slot is assigned for sending control data from the speech path memory 8 to the line processor 23.

As explained above, in the non-concentrated state, the number of time slots in the subscriber side and the number of time slots in the speech path memory side are the same. In the conventional small size exchange system, such as a private branch exchange system, no line concentration system is provided.

The above non-concentrated system is suitable for the situation wherein the traffic of the subscribers is large. However, when the traffic of the subscribers is small, the above non-concentrated exchange system is not effective, i.e., the speech path memory side of the exchange system is not effectively used when the traffic of the subscribers is small in the non-concentrated system.

Therefore, to effectively utilize exchange system, a line concentration system is required to be introduced between the subscriber side and the speech path memory side.

Figure 8:
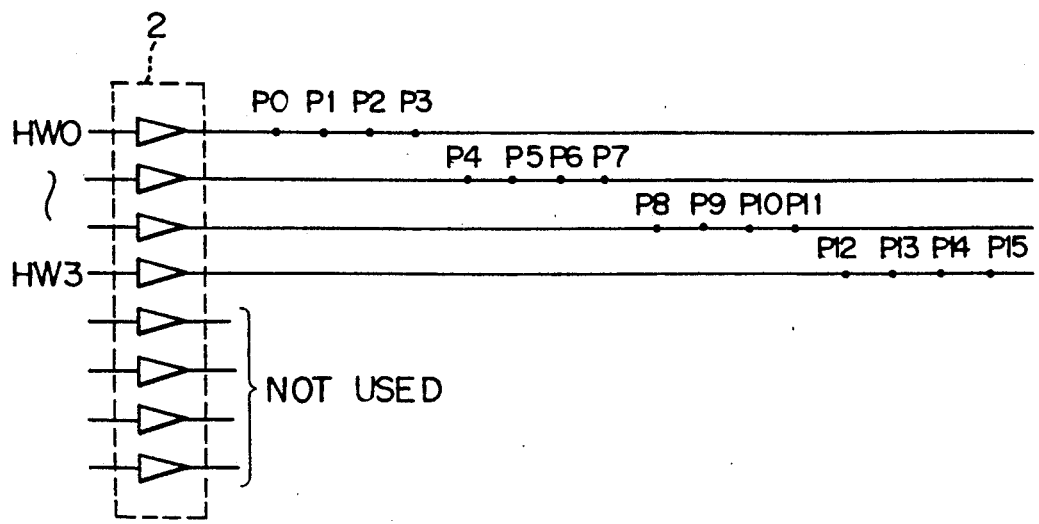
FIG. 8 shows the connections of the plurality of subscribers packages $1_0, 1_1, 1_2, \ldots 1_{15}$ with the data highways $3_0, 3_1, 3_2, \ldots 3_7$, or data highways $4_0, 4_1, 4_2, \ldots 4_7$ in the concentrated connection mode with a concentration rate of two in the construction of FIG. 4.

FIG. 8 shows the connections of the plurality of subscribers packages $1_0$, $1_1$, $1_2$, ... $1_{15}$ with the data highways $3_0$, $3_1$, $3_2$, ... $3_7$, or data highways $4_0$, $4_1$, $4_2$, ... $4_7$ in the concentrated connection mode with a concentration rate of two in the embodiment of the present invention having the construction of FIG. 4, wherein "P0", "P1", ... "P15", each denote an identification number of the subscribers packages, and each corresponds to one of the subscribers packages $1_0$, $1_1$, $1_2$, ... $1_{15}$, as FIG. 7.

Each of the data highways $3_0$, $3_1$, $3_2$, ... $3_7$ is connected with the output terminals of the multiplexers 21 in four of the subscribers packages $1_0$, $1_1$, $1_2$, ... $1_{15}$ and each of the data highways $4_0$, $4_1$, $4_2$, ... $4_7$ is connected with the input terminals of the demultiplexers 22 in four of the subscribers packages $1_0$, $1_1$, $1_2$, ... $1_{15}$.

Since the concentration rates in conventional line concentrators cannot be easily changed as explained before, a plurality of connection units respectively realizing the connections between the subscribers packages and the data highways with respective concentration rates, must be provided, and when changing the concentration rate, disconnecting operation from one connection unit, and connecting operation to the other connection unit must be carried out in the conventional exchange system.

In practice, the above connections of the plurality of subscribers packages $1_0$, $1_1$, $1_2$, ... $1_{15}$ with the data highways $3_0$, $3_1$, $3_2$, ... $3_7$, or data highways $4_0$, $4_1$, $4_2$, ... $4_7$ are realized in the connection unit 26 in a private branch exchange system. The connection unit 26 provides a plurality of slots which enable the above connection.

Figure 9:
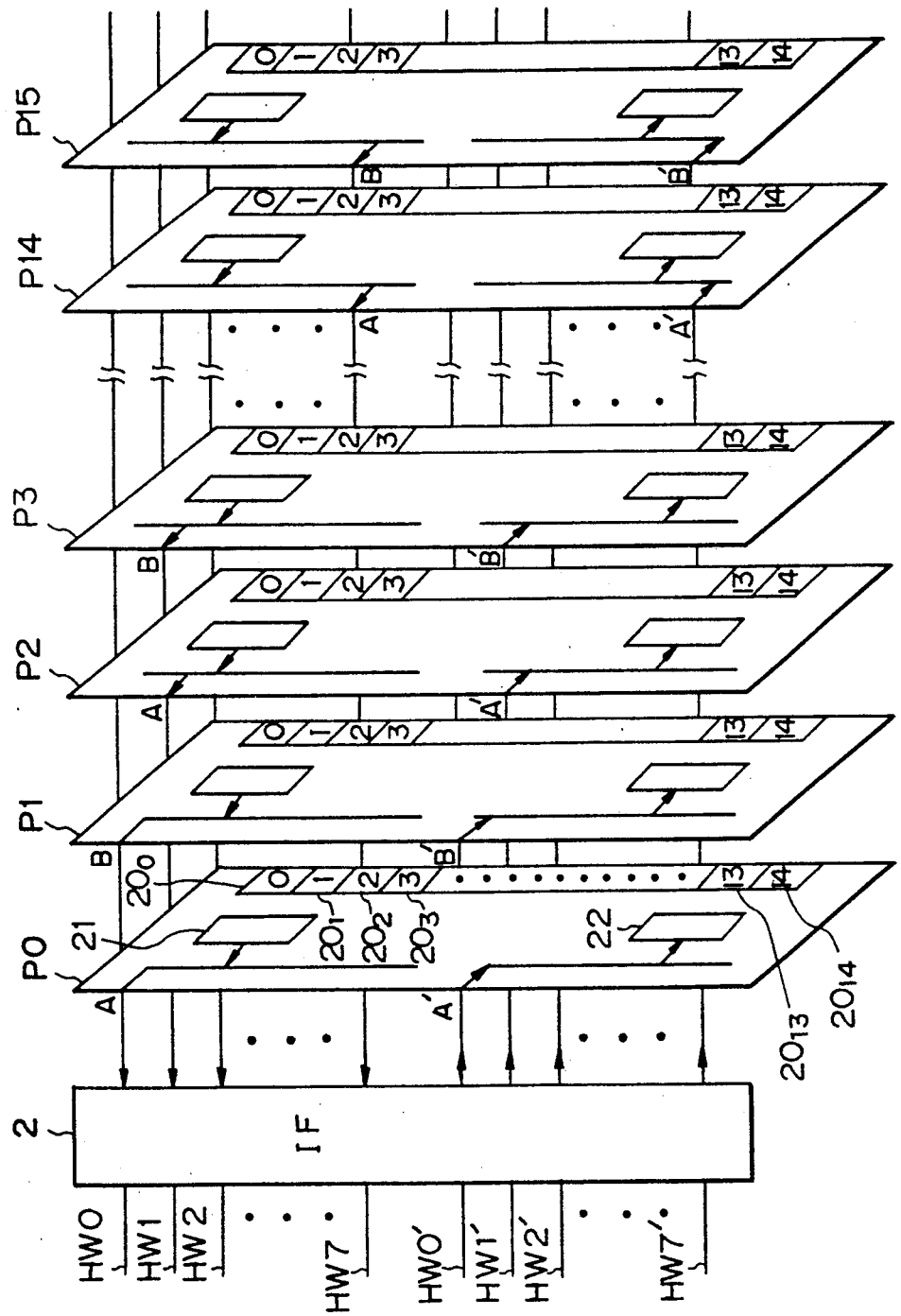
FIG. 9 shows the arrangement of the connections of the plurality of subscribers packages $1_0, 1_1, 1_2, \ldots 1_{15}$ with the data highways $3_0, 3_1, 3_2, \ldots 3_7, 4_0, 4_1, 4_0, \ldots 4_7$ in the connection unit 26 in the construction of FIG. 4.

FIG. 9 shows the arrangement of the connections of the plurality of subscribers packages $1_0$, $1_1$, $1_2$, ... $1_{15}$ with the data highways $3_0$, $3_1$, $3_2$, ... $3_7$, $4_0$, $4_1$, $4_2$, ... $4_7$ in the connection unit 26 in the construction of FIG. 4, wherein "P0", "P1", ... "P15" each denote an identification number of the subscribers packages, and each corresponds to one of the subscribers packages $1_0$, $1_1$, $1_2$, ... $1_{15}$, as FIG. 7, and "HW0", "HW1", ... "HW7" respectively correspond to the data highways $3_0$, $3_1$, $3_2$, ... $3_7$, and "HW0'", "HW1'", ... "HW7'" respectively correspond to the data highways $4_0$, $4_1$, $4_2$, ... $4_7$.

The embodiment of the present invention provides a construction wherein a switching of the concentration rate between a non-concentrated mode and the concentrated mode, maintaining the connection (without the disconnection and the reconnection as in the conventional system) between the plurality of subscribers packages $1_0$, $1_1$, $1_2$, ... $1_{15}$ and the data highways $3_0$, $3_1$, $3_2$, ... $3_7$, $4_0$, $4_1$, $4_2$, ... $4_7$ in the connection unit 26 in the construction of FIG. 4, as shown in FIG. 9.

The above construction according to the present invention is provided in the interface circuit 2 in the following embodiments.

Figure 10:
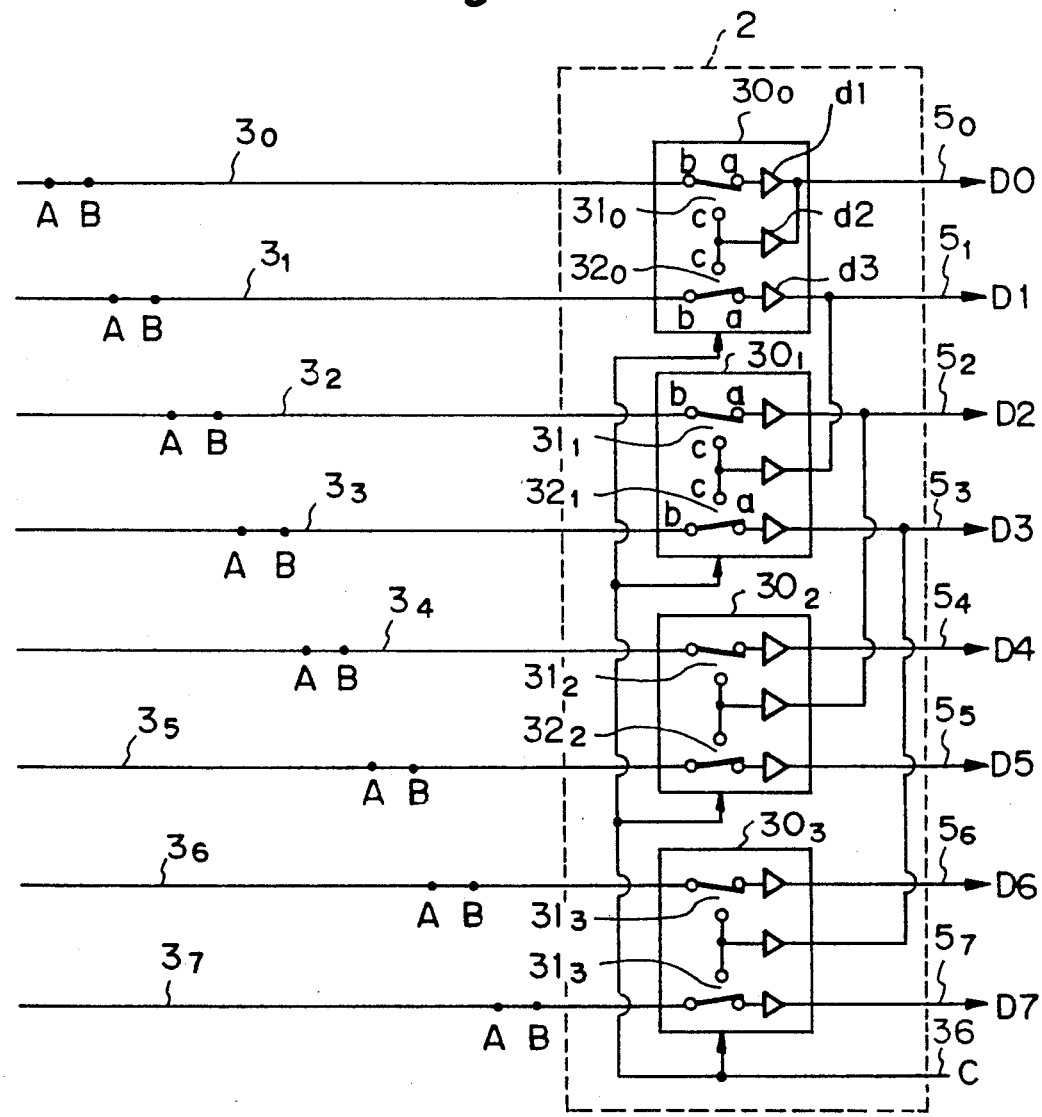
FIGS. 10 and 11 show the construction of the first embodiment of the present invention for allowing the change of the concentration rate.
Figure 11:
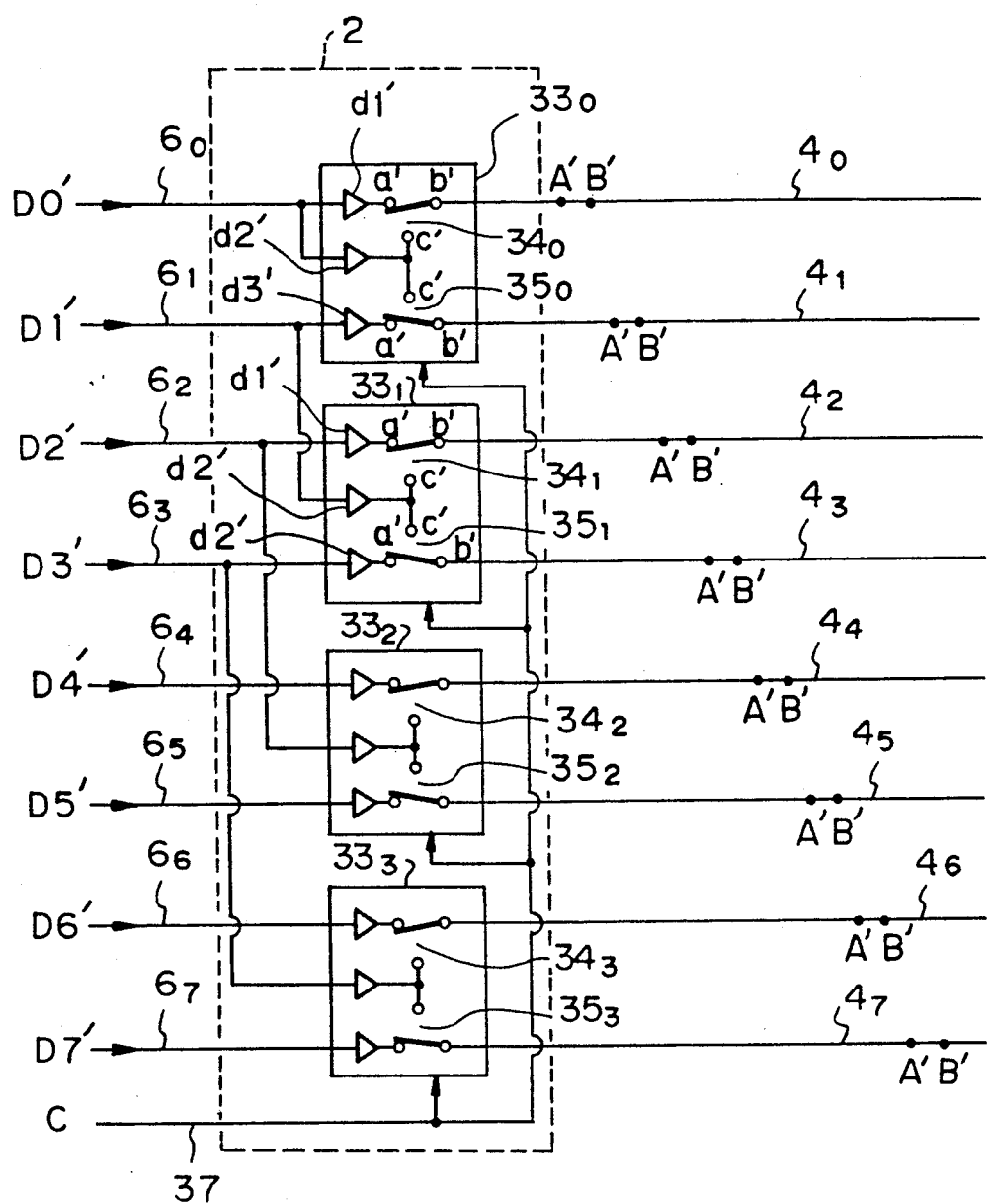

FIGS. 10 and 11 show the construction of the first embodiment of the present invention for allowing the change of the concentration rate, where FIG. 10 shows the construction provided between the data highways $3_0$, $3_1$, $3_2$, ... $3_7$ in the subscriber side and the data highways $5_0$, $5_1$, $5_2$, ... $5_7$ in the speech path memory side and FIG. 11 shows the construction provided between the data highways $6_0$, $6_1$, $6_2$, ... $6_7$ in the speech path memory side and the data highways $4_0$, $4_1$, $4_2$, ... $4_7$ in the subscriber side, in the interface circuit 2 in the arrangement of FIG. 4.

In FIG. 10, reference numeral $30_0$, $30_1$, $30_2$, and $30_3$ each denote a switching circuit, $31_0$, $31_1$, $31_2$, $31_3$, $32_0$, $32_1$, $32_2$, and $32_3$ each denote a switch, d1, d2, and d3 each denote a driver circuit, "a", "b", and "c" each denote a contact of each switch, and "A" and "B" each denote a connecting position of each data highway with a subscribers package.

The "b" contact of each of the switches $31_0$, $31_1$, $31_2$, $31_3$, $32_0$, $32_1$, $32_2$, and $32_3$ can be connected with either of the corresponding "a" contact or "c" contact. When the "b" contact of each of the switches $31_0$, $31_1$, $31_2$, $31_3$, $32_0$, $32_1$, $32_2$, and $32_3$ is connected with the corresponding "a" contact, a connection equivalent to the connection shown in FIG. 7 is realized in the construction of FIG. 10, or when the "b" contact of each of the switches $31_0$, $31_1$, $31_2$, $31_3$, $32_0$, $32_1$, $32_2$, and $32_3$ is connected with the corresponding "c" contact, a connection equivalent to the connection shown in FIG. 8 is realized in the construction of FIG. 10.

Similarly, in FIG. 11, reference numeral $33_0$, $33_1$, $33_2$, and $33_3$ each denote a switching circuit, $34_0$, $34_1$, $34_2$, $34_3$, $35_0$, $35_1$, $35_2$, and $35_3$ each denote a switch, d1, d2, and d3 each denote a driver circuit, "a'", "b'", and "c'" each denote a contact of each switch, and "A" and "B" each denote a connecting position of each data highway with a subscribers package.

The "b'" contact of each of the switches $34_0$, $34_1$, $34_2$, $34_3$, $35_0$, $35_1$, $35_2$, and $35_3$ can be connected with either of the corresponding "a'" contact or "c'" contact. When the "b'" contact of each of the switches $34_0$, $34_1$, $34_2$, $34_3$, $35_0$, $35_1$, $35_2$, and $35_3$ is connected with the corresponding "a'" contact, a connection equivalent to the connection shown in FIG. 7 is realized in the construction of FIG. 11, or when the "b'" contact of each of the switches $34_0$, $34_1$, $34_2$, $34_3$, $35_0$, $35_1$, $35_2$, and $35_3$ is connected with the corresponding "c'" contact, a connection equivalent to the connection shown in FIG. 8 is realized in the construction of FIG. 11.

Figure 12:
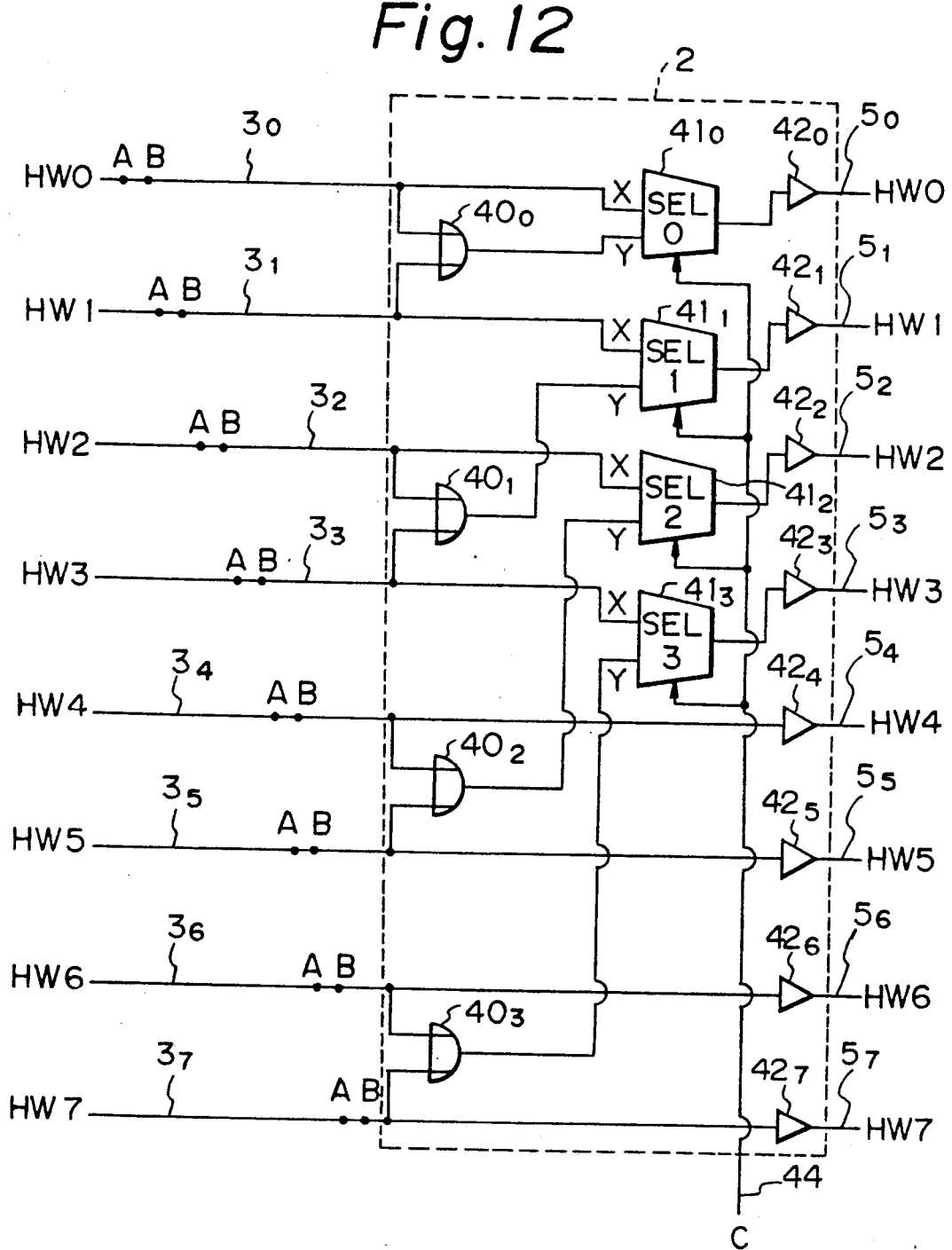
FIGS. 12 and 13 show the construction of the second embodiment of the present invention for allowing the change of the concentration rate.
Figure 13:
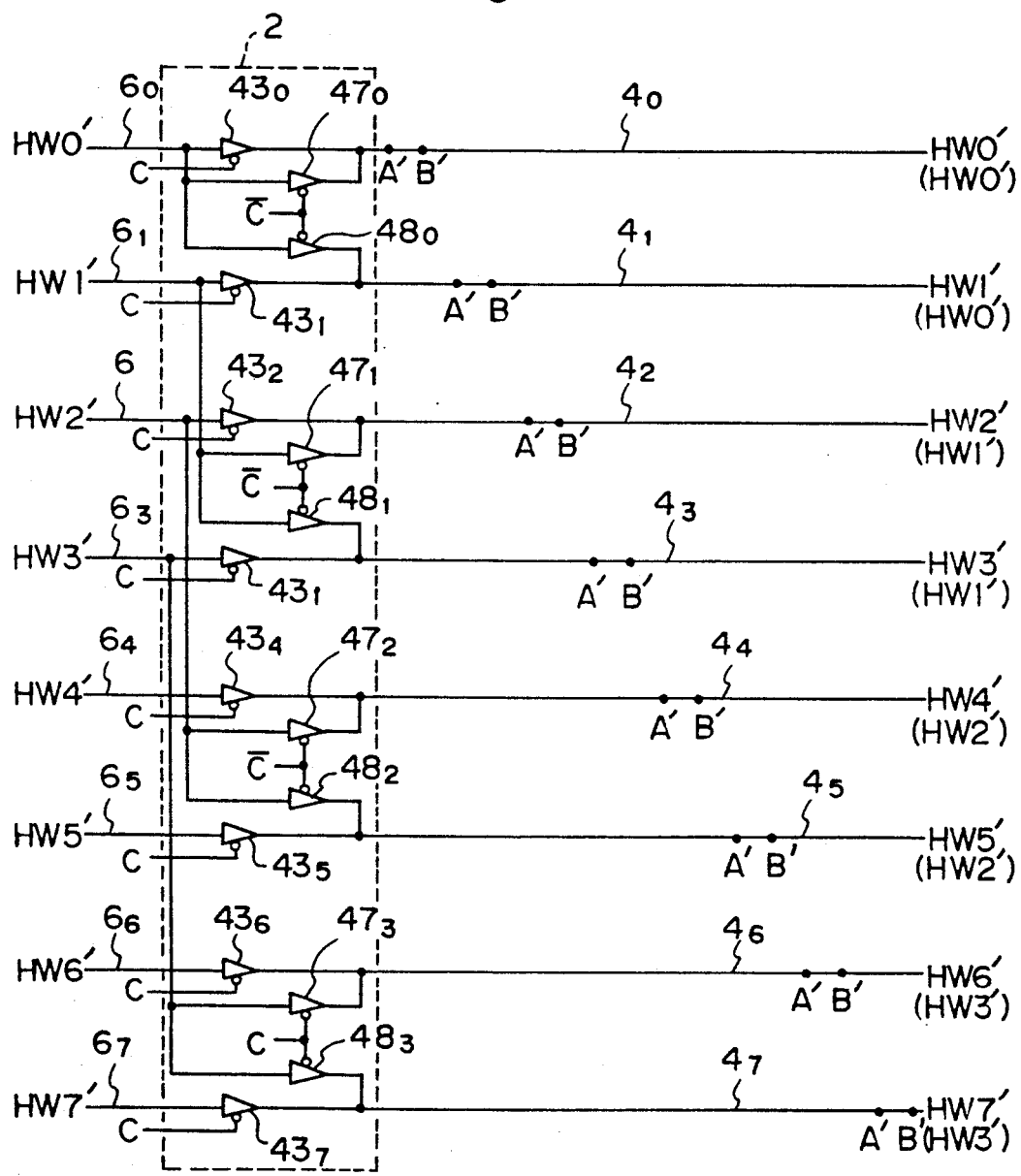

FIGS. 12 and 13 show the construction of the second embodiment of the present invention for allowing the change of the concentration rate, where FIG. 12 shows the construction provided between the data highways $3_0$, $3_1$, $3_2$, ... $3_7$ in the subscriber side and the data highways $5_0$, $5_1$, $5_2$, ... $5_7$ in the speech path memory side, and FIG. 13 shows the construction provided between the data highways $6_0$, $6_1$, $6_2$, ... $6_7$ in the speech path memory side and the data highways $4_0$, $4_1$, $4_2$, ... $4_7$ in the subscriber side in the interface circuit 2 in the arrangement of FIG. 4.

In FIG. 12, reference numeral $40_0$, $40_1$, $40_2$, and $40_3$ each denote an OR gate, $41_0$, $41_1$, $41_2$, and $41_3$ each denote a selector, $42_0$, $42_1$, $42_2$, ... $42_7$, each denote a driver circuit, and "A" and "B" each denote a connecting position of each data highway with a subscribers package.

One terminal of each of the data highways $3_0$ and $3_1$ are connected to the input terminals of the OR gate $40_0$, one terminal of each of the data highways $3_2$ and $3_3$ are connected to the input terminals of the OR gate $40_1$, one terminal of each of the data highways $3_4$ and $3_5$ are connected to the input terminals of the OR gate $40_2$, and one terminal of each of the data highways $3_6$ and $3_7$ are connected to the input terminals of the OR gate $40_3$. The above terminal of the data highway $3_0$ and the output of the OR gate $40_0$ are applied to the selector $41_0$, the above terminal of the data highway $3_1$ and the output of the OR gate $40_1$ are applied to the selector $41_1$, the above terminal of the data highway $3_2$ and the output of the OR gate $40_2$ are applied to the selector $41_2$, and the above terminal of the data highway $3_3$ and the output of the OR gate $40_3$ are applied to the selector $41_3$. The output terminals of the selectors $41_0$, $41_1$, $41_2$, and $41_3$ are each connected to the data highways $5_0$, $5_1$, $5_2$, and $5_3$, through the driver circuits $42_0$, $42_1$, $42_2$, and $42_3$, respectively. The above terminals of the data highways $3_4$, $3_5$, $3_6$, and $3_7$ are each connected through the driver circuits $42_4$, $42_5$, $42_6$, and $42_7$ to the data highways $5_4$, $5_5$, $5_6$, and $5_7$, respectively.

A control signal C is applied to the control input of all the selectors $41_0$, $41_1$, $41_2$, and $41_3$. When the control signal C is "1", the selectors $41_0$, $41_1$, $41_2$, and $41_3$ each select the inputs from the data highways $3_0$, $3_1$, $3_2$, and $3_3$, respectively, and thus, a connection equivalent to the connection shown in FIG. 7 is realized in the construction of FIG. 12. Or when the control signal C is "0", the selectors $41_0$, $41_1$, $41_2$, and $41_3$ each select the inputs from the OR gates $40_0$, $40_1$, $40_2$, and $40_3$, respectively, and thus, a connection equivalent to the connection shown in FIG. 8 is realized in the construction of FIG. 13.

In FIG. 13, reference numeral $43_0$, $43_1$, $43_2$, ... $43_7$, $47_0$, $47_1$, $47_2$, $47_3$, $48_0$, $48_1$, $48_2$, and $48_3$ each denote a tristate buffer circuit, and "A'" and "B'" each denote a connecting position of each data highway with a subscribers package..

One terminal of each of the data highways $6_0$, $6_1$, $6_2$, ... $6_7$, is connected with a corresponding one of the data highways $4_0$, $4_1$, $4_2$, ... $4_7$, through the corresponding one of the tristate buffer circuits $43_0$, $43_1$, $43_2$, ... $43_7$, respectively. The above terminal of the data highway $6_0$ is further connected with the input terminals of both the tristate buffer circuits $47_0$ and $48_0$, the above terminal of the data highway $6_1$ is further connected with the input terminals of both the tristate buffer circuits $47_1$ and $48_1$, the above terminal of the data highway $6_2$ is further connected with the input terminals of both the tristate buffer circuits $47_2$ and $48_2$, and the above terminal of the data highway $6_3$ is further connected with the input terminals of both the tristate buffer circuits $47_3$ and $48_3$. The output terminals of the tristate buffer circuits $47_0$, $47_1$, $47_2$, $47_3$ are each connected to the data highways $4_0$, $4_2$, $4_4$, and $4_6$, respectively. The output terminals of the tristate buffer circuits $48_0$, $48_1$, $48_2$, $48_3$ are each connected to the data highways $4_1$, $4_3$, $4_5$, and $4_7$, respectively.

The above-mentioned control signal C is applied to the control terminals of the tristate buffer circuits $43_0$, $43_1$, $43_2$, ... $43_7$, and the inverted signal $\overline{C}$ of the control signal C is applied to the control terminals of the tristate buffer circuits $47_0$, $47_1$, $47_2$, $47_3$, $48_0$, $48_1$, $48_2$, and $48_3$.

When the control signal C is "1", the data highways $6_0$, $6_1$, $6_2$, ... $6_7$, is connected with a corresponding one of the data highways $4_0$, $4_1$, $4_2$, .. $4_7$, respectively, and thus, a connection equivalent to the connection shown in FIG. 7 is realized in the construction of FIG. 12. Or when the control signal C is "0", the data highway $6_0$ is connected with both the data highways $4_0$ and $4_1$, the data highway $6_1$ is connected with both the data highways $4_2$ and $4_3$, the data highway $6_2$ is connected with both the data highways $4_4$ and $4_5$, and the data highway $6_3$ is connected with both the data highways $4_6$ and $4_7$. Thus, a connection equivalent to the connection shown in FIG. 8 is realized in the construction of FIG. 13.

The above control signal C can be generated, for example, by providing a manual switch (not shown) which is connected with the interface circuit, or by control from the call processor 13.

In the construction explained above, the timings of sending and receiving of data from and at each subscribers package $1_0$, $1_1$, $1_2$, ... $1_{15}$, are controlled by the call processor 13 through the line processor 23 in each subscribers package so that data from two subscribers packages are not doubly input onto the same time slot on a data highway, and data from one time slot on a data highway is not doubly received at two subscribers packages.

Although the constructions realizing a switching of connections between the non-concentrated mode and the concentrated mode with the concentration rate of two, it is easily understood that a connection switching circuit, which is provided between a plurality of subscriber side transmission lines and a plurality of speech path memory side transmission lines, for connecting a controlled number (one or two in the above embodiment) of corresponding subscriber side transmission lines with a corresponding one of the plurality of speech path memory side transmission lines, can be constructed by providing: a plurality of modes of connection paths, where each mode of the connection paths realize the connections between a predetermined number of the subscriber side transmission lines and a corresponding one of the plurality of speech path memory side transmission lines, and the predetermined number is predetermined for each mode; and a plurality of gates which are located in all the connection paths, and are each controlled to pass or not to pass an applied signal so that only one mode of the connection paths, where the predetermined number in the mode is equal to the above controlled number, is realized at one time. This is shown in FIG. 13, and it is known that the selectors in the construction of FIG. 12 can be constructed by the gate circuits as above-mentioned.

Therefore, a line concentration system wherein a switching between any concentration rates among a plurality of predetermined concentration rates can be easily carried out by a control signal for controlling gates as above, can be realized according to the present invention.

I claim:

1. A line concentration system comprising:
   a plurality of first-side transmission lines capable of transmitting data;
   a plurality of data input means for inputting data at a controlled timing from a first-side transmission line to which each data input means is connected;
   a plurality of second-side transmission lines capable of transmitting a predetermined number of channels of data;
   connection switching means, provided between said plurality of first-side transmission lines and said plurality of second-side transmission lines, for connecting each of a number m of said plurality of first-side transmission lines with one of said plurality of second-side transmission lines, where m corresponds to a concentration rate and the concentration rate can be varied in accordance with a control input; and
   a data input timing control means for providing the controlled timing for said plurality of data input means so that the data inputting is not simultaneously performed by two of said data input means.

2. A line concentration system according to claim 1, wherein each of said data input means comprises
   a plurality of line circuits, each provided for a corresponding subscriber, to carry out operations including loop supervision, receiving a dialing signal, or ringing, to obtain data from a corresponding subscriber,
   a demultiplexer connected to demultiplex data from said first-side transmission line connected to a corresponding data input means and output demultiplexed data corresponding line circuits under control of said line and
   a line processor connected to control the timing of the data input from the first-side transmission line to said demultiplexer based on control information given from said call processor and to control reception of the demultiplexed data output from said demultiplexer to said line processor, and
   wherein said data input timing control means comprises a call processor, operatively connected to said input means and said line processor, to collect all statuses of all said input means regarding use of the corresponding first-side transmission lines from a corresponding line processor and to give the control information on timing of the data input, from the corresponding first-side transmission line to a corresponding demultiplexer, to all said processors in all said plurality of data input means.

3. A line concentration system according to claim 1, wherein said connection switching means comprises:
   a plurality of modes of connection paths, where each mode of the connection paths realize the connections between a predetermined number of said first-side transmission lines and a corresponding one of said plurality of second-side transmission lines, the predetermined number being predetermined for each mode; and
   a plurality of gates located in all the connection paths and each controlled to selectively pass an applied signal so that only one mode of the connection paths, where the predetermined number in the mode is equal to the controlled number, is realized at one time.

4. A line concentration system comprising:
   a plurality of first-side transmission lines capable of transmitting data;
   a plurality of data output means for outputting data at a controlled timing from a first-side transmission line to which each data output means is connected;
   a plurality of second-side transmission lines capable of transmitting a predetermined number of channels of data;
   connection switching means, provided between said plurality of first-side transmission lines and said plurality of second-side transmission lines, for connecting each of a number m of said plurality of first-side transmission lines with one of said plurality of second-side transmission lines, where m corresponds to a concentration rate and the concentration rate can be varied in accordance with a control input; and
   a data output timing control means for providing the controlled timing for said plurality of data output means so that the data outputting is not simultaneously performed by two of said data output means.

5. A line concentration system according to claim 4, wherein each of said data output means comprises
   a plurality of line circuits, each provided for a corresponding subscriber, each of said line circuit means for carrying out operations including loop supervision, receiving a dialing signal, or ringing, to obtain data from a corresponding subscriber,
   a multiplexer connected to multiplex data from said plurality of line circuits and output multiplexed data onto said first-side transmission line which is connected to a corresponding data output means, and
   a line processor connected to control the timing of the data output from the first-side transmission line to said demultiplexer based on control information given from said call processor, and
   wherein said data input timing control means comprises a call processor, operatively connected to said output means and said line processor, to collect all statuses of all said output means regarding use of the corresponding first-side transmission line from a corresponding line processor and to give the control information on timing of the date outputted, from said multiplexer, to all said line processors in all said plurality of data output means.

6. A line concentration system according to claim 4, wherein said connection switching means comprises:
   a plurality of modes of connection paths, where each mode of the connection paths realize the connections between a predetermined number of said first-side transmission lines and a corresponding one of said plurality of second-side transmission lines, the predetermined number being predetermined for each mode; and a plurality of gates located in all the connection paths and each controlled to selectively pass an applied signal so that only one mode of the connection paths, where the predetermined number in the mode is equal to the controlled number, is realized at one time.

* * * * *

UNITED STATES PATENT AND TRADEMARK OFFICE
CERTIFICATE OF CORRECTION

PATENT NO. : 5,029,160

DATED : July 2, 1991

INVENTOR(S) : Homma

It is certified that error appears in the above-identified patent and that said Letters Patent is hereby corrected as shown below:

Title page [57] Abstract line 1, "containing:" should be --is provided with--;
    line 2, "circuits;" should be --circuits,--;
    line 4, "connected;" should be --connected,--;
    line 7, "lines," should be --lines--;
    line 19, "circuits, which is provided for connecting" should be --circuits to connect--;
    line 21, "line; and the" should be --line.  The--;
    line 22, "can be" should be --can thus be--.

Col. 1,   line 5, "(1) Technical" should be
              --(1) Technical Field--;

line 7, "is in" should be --is--;
        line 18, "side capacities in the" should be
              --side and capacities of the--.

UNITED STATES PATENT AND TRADEMARK OFFICE
CERTIFICATE OF CORRECTION

PATENT NO. : 5,029,160

DATED : July 2, 1991

Page 2 of 2

INVENTOR(S) : Homma

It is certified that error appears in the above-identified patent and that said Letters Patent is hereby corrected as shown below:

Col. 3, line 1, "snow" should be --show--;
       line 4, "shows," should be --shows--;
       line 21, "$4_0, \ldots 4_7$" should be --$4_2, \ldots 4_7$--.

Col. 5, line 19, "$4_7;,$" should be --$4_7,$--;
       line 29, "denotes" should be --denote--.

Col. 11, lines 50 and 51, "corresponding line circuits under control of said line and" should read --, and--.

Signed and Sealed this

Seventeenth Day of November, 1992

Attest:

DOUGLAS B. COMER

Attesting Officer

Acting Commissioner of Patents and Trademarks